(No Model.)
J. E. BOTT.
CIRCULAR SAW.
No. 514,207.   Patented Feb. 6, 1894.
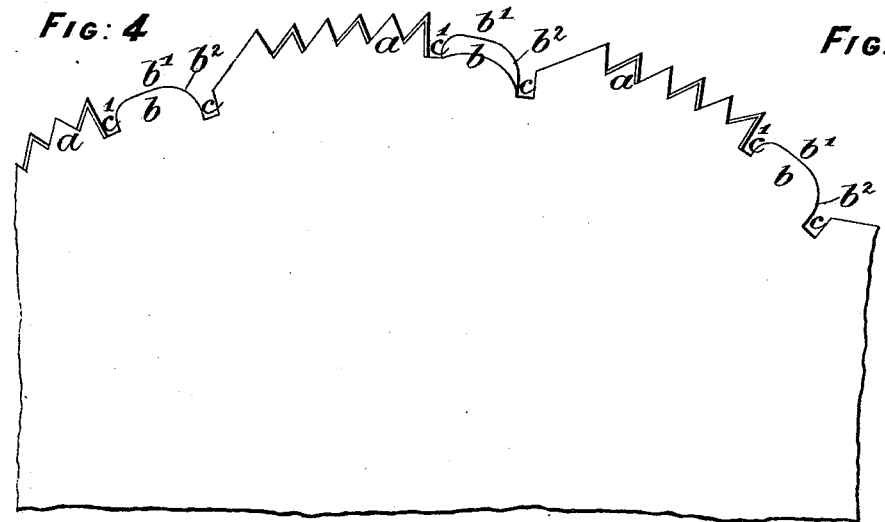
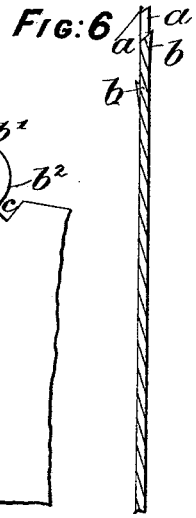
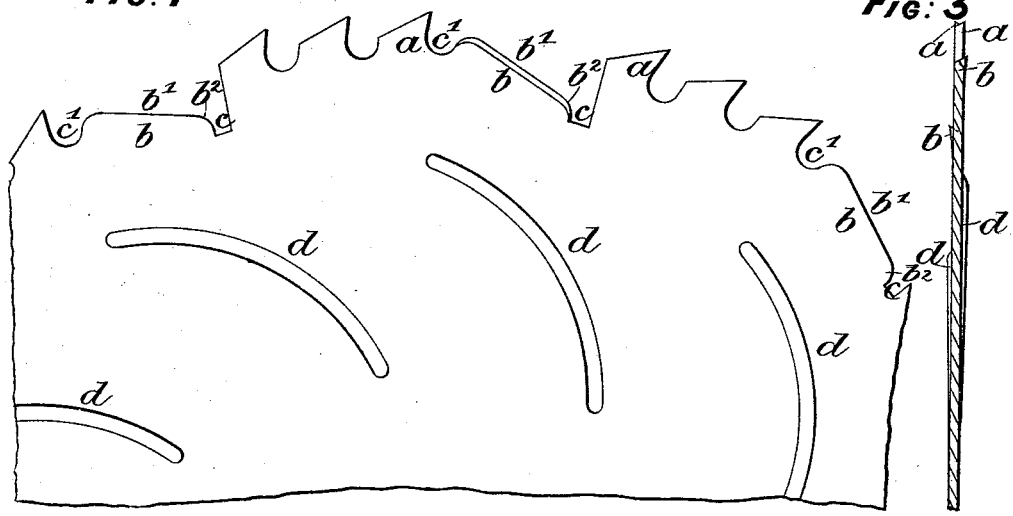
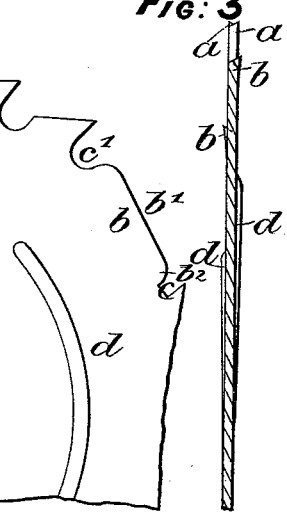
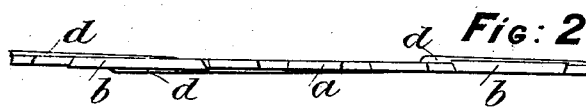
Witnesses:   Inventor:

UNITED STATES PATENT OFFICE.

JOSEPH ELTON BOTT, OF EYAM, ENGLAND.

CIRCULAR SAW.

SPECIFICATION forming part of Letters Patent No. 514,207, dated February 6, 1894.

Application filed July 23, 1890. Serial No. 359,635. (No model.)

*To all whom it may concern:*

Be it known that I, JOSEPH ELTON BOTT, metallurgist, a subject of the Queen of Great Britain, residing at Eyam, in the county of Derby, England, have invented certain new and useful Improvements in Circular Saws, of which the following is a specification.

The invention has for its object improvements in circular saws, whereby they are enabled not only to cut up material but also at the same time to produce planed and finished surfaces on the faces of the material on each side of the saw. For this purpose I form the saw with ordinary saw teeth and with planing teeth, a number of saw teeth (preferably from three to six) alternating with a single planing tooth or cutter. The saw teeth are as usual formed with cutting edges at their points and they may be "set" alternately to each side of the saw, while the planing teeth are of considerable length and are "set" and have the cutting edges alternately along one or other side of the periphery or outer edge or back of each planing cutter. A space or gullet is formed between each set of saw teeth and each adjacent planing tooth or cutter, to the front and to the rear thereof, and the periphery, outer edge, or back of each planing tooth or cutter, gradually recedes from the point thereof to the rear, where it meets the gullet between it and the following set of saw teeth, so as to produce a draw cut.

In order to stiffen the saw, I raise curved ribs alternately on each side thereof, one of such ribs being formed a short distance from the periphery, outer edge, or back of each planing tooth or cutter, and of somewhat considerable length; these stiffening ribs also act to smooth or polish the planed surfaces.

In order that my said invention may be more clearly understood and readily carried into effect, I will proceed aided by the accompanying drawings, more fully to describe the same.

In the drawings Figure 1 is a side view, Fig. 2 is an edge view, and Fig. 3 is a cross section of part of a circular ripping saw constructed according to my invention, and Figs. 4, 5 and 6 are similar views of a circular cross cut saw also formed according to my invention.

In all the figures like parts are indicated by similar letters of reference.

$a, a$ represent the saw teeth, which are preferably arranged in sets of three or more, sets of three being shown in the saw represented at Figs. 1, 2, and 3, and sets of six in that shown at Figs. 4, 5, and 6. The saw teeth $a, a,$ are formed with the usual cutting edges at their points, but the "set" usually given to such teeth alternately on each side of the saw is dispensed with in those shown in the drawings. The planing teeth or cutters $b$ are of considerable length and are very slightly "set" alternately to one and to the other side of the saw, and they have their cutting edges formed alternately along one or other side of their periphery, outer edge, or back $b'$.

A deep space or gullet $c$ is formed between each set of saw teeth $a$ and the front or point of each planing tooth or cutter $b$, and a space or gullet $c'$, more or less deep according to the character of the saw, is made between the rear of each planing tooth or cutter $b$ and the first of the set of saw teeth $a$ to the rear thereof, while the periphery, outer edge, or back $b'$ of each planing tooth or cutter $b$ gradually rises from the point or nose $b^2$ thereof to the rear, where it meets the gullet $c'$ between it and the following set of saw teeth $a$, so as to produce a draw cut.

In order to stiffen the saw, I raise, as represented at Figs. 1, 2, and 3, curved ribs $d$ alternately on each side thereof, one of such ribs being formed a short distance from the periphery, outer edge, or back $b'$ of each planing tooth or cutter $b$, and of somewhat considerable length. These stiffening ribs are made to project at their outer ends but very slightly from the plane of the saw, while such projection gradually decreases to their inner ends. In addition to stiffening the saw, these ribs $d$ also act to smooth or polish the planed surfaces. I have not represented these ribs $d$ as applied to the cross cut saw shown at Figs. 4, 5, and 6, but if desired they may also be formed on such saw.

The saw teeth of the ripping saw shown at Figs. 1, 2, and 3, are, as is usual in ordinary ripping saws, sharpened nearly square across their points or front edges, while the saw teeth of the cross cut saw shown at Figs. 4, 5 and 6 are, as is usual with other cross cut saws, sharpened at a more acute angle.

The planing teeth or cutters $b$ of the ripping saw, as will be seen by reference to Fig. 1, are sharpened at a comparatively slight angle across their peripheries, outer edges, or backs, while those of the cross cut saw, as will be seen by reference to Fig. 4, are sharpened at a much more acute angle.

I would here remark that the number of saw teeth in each set and the shape, dimensions and proportions of the same and of the planing teeth or cutters may be varied without departing from the essential character of my invention.

What I claim, and desire to secure by Letters Patent, is—

1. In a circular saw, the combination of planing teeth and sets of saw teeth alternately disposed on the periphery of the saw, said planing teeth having their cutting edge about on a line with the base of the saw teeth, a gullet provided immediately in front of each planing tooth between it and the next adjacent saw tooth and extending toward the center of the saw blade, below the level of the base of the saw teeth, for a distance sufficient to allow the planing teeth to be readily set, and a gullet provided at the rear of each planing tooth, substantially as described.

2. In a circular saw, the combination of a series of sets of saw teeth and a series of single planing teeth alternately disposed on the periphery of the saw, the cutting edges of said planing teeth being about on a line with the base of the saw teeth, gullets provided immediately in front and at the rear of each planing tooth, said gullets extending in toward the center of the saw to a greater distance than do the spaces between adjacent saw teeth, and the periphery of each planing tooth gradually rising or increasing its distance from the center of the saw from the forward end to the gullet at the rear of the same, substantially as specified.

3. In a circular saw, the combination of two or more saw teeth provided in series of sets circumferentially upon the saw blade, an elongated planing tooth provided between each two sets of saw teeth, said planing teeth having their cutting edge along the side of said tooth about on a line with the base of the saw teeth, the cutting edge of each alternate planing tooth being disposed on the opposite side from the cutting edge of the proximate planing tooth, a gullet provided immediately in front of each planing tooth below the level of the base of the saw teeth of a depth sufficient to allow the planing teeth to be readily set, and a gullet of less depth than the forward gullet provided at the rear of each planing tooth, between it and the next adjacent set of saw teeth, the cutting edge of said planing teeth being at a greater distance from the center of the saw at the rear end thereof than at the front and partially rounded at the rear or highest point, substantially as described.

4. In a circular saw, the combination of planing teeth or cutters, saw teeth or sets of saw teeth, and stiffening and polishing ribs arranged below the planing and saw teeth and independent of said teeth, substantially as herein shown and described.

JOSEPH ELTON BOTT.

Witnesses:
B. J. B. MILLS,
CLAUDE K. MILLS,
*Both of 23 Southampton Buildings, London.*